May 26, 1942.　　　R. BENNETT　　　2,283,906
SEWAGE METER
Filed March 24, 1941
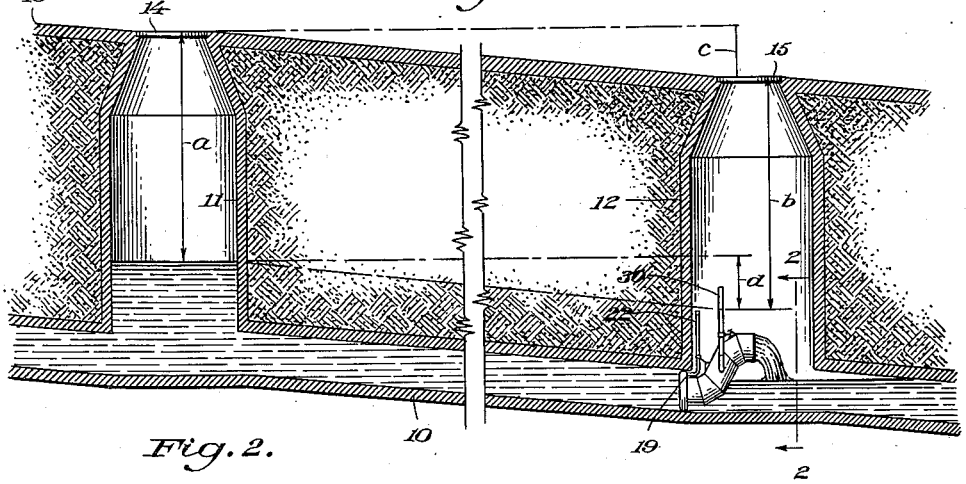
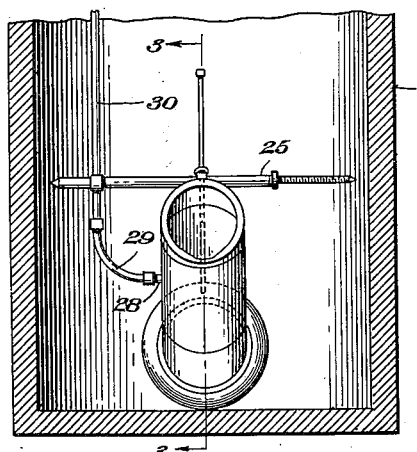
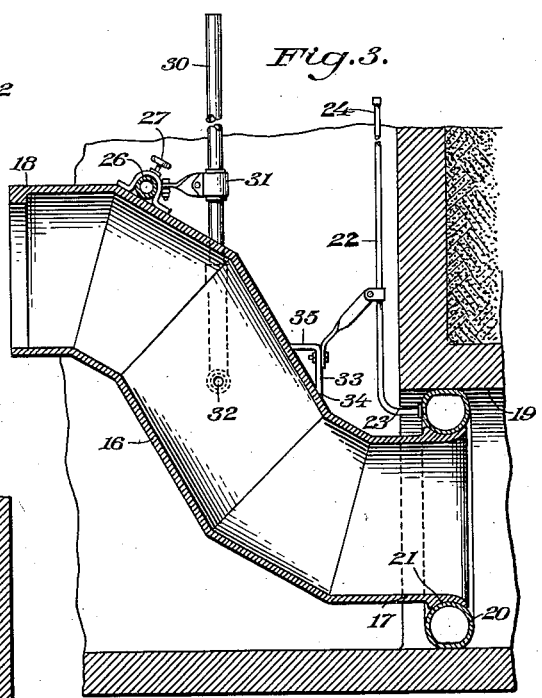
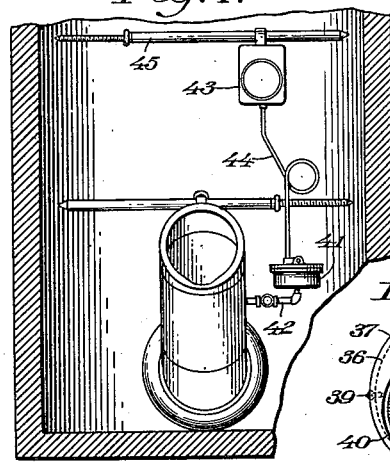
Richard Bennett,
INVENTOR
BY Victor J. Evans & Co.
ATTORNEYS Patented May 26, 1942

2,283,906

UNITED STATES PATENT OFFICE 2,283,906

SEWAGE METER

Richard Bennett, Phoenix, Ariz.

Application March 24, 1941, Serial No. 384,988

5 Claims. (Cl. 73—215)

My invention relates to new and useful improvements in metering devices for measuring the flow of fluid through flow line systems.

Gravity flow lines are employed for many purposes such as sewage systems, storm sewers and irrigation projects. The flow of fluid through these systems is caused by gravity and my invention is particularly adapted to be applied to conduits of this nature located below the ground surface. The flow of fluid through these systems is subject to great fluctuation. For example, a storm sewer may be taxed to its full capacity during a violent storm, while during an extended drought, the flow may become very small. Similarly, in sewage systems there is a great variation in the quantity of sewage flow at different hours during the day and night and this variation has a material influence on the capacity and arrangement of the collection system. In order to operate such a system properly and secure data from which it is possible to plan future extensions or reinforcements to existing systems, it is very essential to be able to determine the peak flow which the system is required to accommodate.

It is therefore an important object of my invention to provide a device for measuring the rate of flow of fluid through a closed conduit, which conduit usually runs less than full or under slight pressure. My device is unique to permit an accurate determination of the rate of flow within the conduit even through the flow through the conduit is very slight.

Heretofore, the conventional flow measuring devices, such as Venturi tubes, orifice plates, flow weirs, and the like, require permanent installation and the costs involved in securing essential data, have, in many instances, been prohibitive. The conventional flow measuring devices heretofore available require, further, that the conduits run normally less than full, or full and under pressure. Within my knowledge no adequate means has existed which is capable of measuring the quantity of flow in a closed conduit, which flow ranges from a small percentage of the conduit capacity to a flow in excess of the conduit capacity.

Another object of my invention, therefore, is the provision of a device of the above-mentioned character that is small and compact in its construction, that is readily portable and that may be easily and expeditiously detachably mounted in a flow line, the device being efficient and efficacious in its operation to determine the rate of flow of the fluid through the conduit for any particular time or interval of time and under wide variations in the conditions of flow.

Sewage systems become clogged and require cleaning at regular intervals. It is highly desirable that some means be provided for periodically determining the instant carrying capacity of a sewer as compared with a new sewer of the same size. To my knowledge, engineering inspections have, on many occasions, shown that the sewage flow in a certain flow line was excessive and when new pipes were installed to relieve this particular flow line, it was found that the peak flow was not in excess of forty percent of the capacity of the original flow line. The condition observed by the inspection was due to cloggage of the line and all that was necessary to restore the flow line to its full carrying capacity was a thorough cleaning.

It is, therefore, a further object of my invention to provide a metering device which will permit an engineer to easily and accurately determine the percentage of cloggage of a flow line and the engineer will, as a natural consequence, be able to make carrying capacity tests before cleaning and after cleaning to accurately determine the quality or efficiency of the cleaning work performed. The removable nature or character of my device permits the engineeer to obtain the above data and to operate his system with the minimum maintenance cost.

Other objects and advantages of my invention will be apparent during the course of the following description.

In the drawing, forming a part of this specification, and wherein like numerals are employed to designate like parts throughout the same, Figure 1 is a side elevation of a device embodying my invention and showing the same mounted in a gravity flow line, Figure 2 is an enlarged vertical sectional view taken on the line 2—2 of Figure 1, Figure 3 is a vertical sectional view taken on the line 3—3 of Figure 2, Figure 4 is a view similar to Figure 2, but showing a modified pressure sensitive recording instrument comprising a part of my invention, and Figure 5 is a perspective view of a removable plate element comprising a part of the invention.

In the accompanying drawing, wherein for the purpose of illustration, is shown a preferred embodiment of my invention, the numeral 10 designates a flow line of the type generally employed in sewage systems, or the like. The flow line is of tubular formation and may be formed of metallic or concrete pipes or any other material suitable for the purpose. The conventional sewage systems are provided with manholes 11 and 12 at spaced intervals along the length of the flow line 10, which manholes are connected to and communicate with the flow line and rise vertically therefrom to the surface 13 of the ground. The manholes 11 and 12 are here illustrated as being closed by the covers 14 and 15 in the conventional manner. It is to be understood that the above system comprises no part of the present invention but is merely illustrated and described for the purpose of showing the manner in which my metering device may be applied to a conventional sewage system.

My device comprises a tubular conduit 16 having an inlet end 17 and an outlet or discharge end 18. The inlet and outlet end portions of the conduit are arranged in parallel relation and the intermediate portion thereof is reversely curved, as illustrated in Figures 1 and 3 to position the discharge end substantially above the inlet end. The conduit is here illustrated as being of circular formation in cross-section, however, it may obviously be made in any desired shape, the essential features being that the conduit be tubular in its nature, that the discharge end be parallel or substantially parallel to the inlet end and that it be located above the crown 19 of the flow line when the inlet end of the conduit is mounted therein.

In order that the inlet end of the conduit may be securely but removably mounted in the flow line, I have provided an inflatable tire or tube 20 which surrounds this end of the conduit and has a pressed peripheral engagement with the internal wall of the flow line. As best illustrated in Figure 3, the inlet end of the conduit is formed with an outer annular groove 21 in which the tube 20 is seated and which prevents the tube from being longitudinally displaced along the conduit.

In mounting the conduit in the flow line, the operator enters the lowermost manhole 12 and inserts the inlet end of the conduit a slight distance into the flow line so that the discharge end thereof extends upwardly into the manhole and above the crown 19. When the tube 20 is deflated it may readily be made to enter the flow line. In order that air may be introduced into the tube after the same has been placed within the flow line I have provided an air pipe 22 having a right angularly disposed end portion 23 which extends through the inner side of the tube. The air pipe thus projects outwardly of the flow line and into the manhole when it extends upwardly and along the vertical wall thereof to dispose its free end 24 in a position readily accessible to the operator. The air pipe is provided with a conventional valve which permits air to be pumped into the tube 20 to inflate the same and after inflation it is obvious that the periphery of the tube will frictionally press against the inner wall of the flow line and that, by reason of the inherently flexible or yieldable nature of the tube, it will readily accommodate itself to any slight irregularities in the surface of the flow line wall in a manner to provide a fluid tight union therebetween. An extensible rod 25 extends through a band 26 carried by the upper end of the conduit and the opposite ends thereof press against the side walls of the manhole to hold the upper end of the conduit immovably positioned, while a set screw 27 extends through the band and abuts against the rod to hold the two in fixed relative association.

Any flow line which operates on the gravity flow principle must necessarily be inclined from the horizontal and the section of the flow line extending between the manholes 11 and 12 has been so illustrated. The angle at which the flow line inclines from the horizontal provides a flow gradient and it is obvious that liquid flowing within the line will flow from the upper to the lower end thereof by gravity. As soon as the operator places the conduit 16 in the lower end of the flow line, the liquid may not continue to flow through the line without first traversing the conduit because of the sealed engagement of the inflatable tube 20 with the wall of the flow line. Inasmuch as the outlet end of the conduit is disposed substantially above the inlet end thereof, the liquid will back up in the flow line until a sufficient head has been developed to raise the liquid in the conduit a sufficient distance to permit the same to flow through the discharge end 18. It may thus be seen that even though the flow line 10 is running only partially full, the backing up of the water resulting from the insertion of the conduit 16 therein will provide a section of flow line immediately above the conduit which is running full and under slight pressure created by the head of liquid thus formed.

For the purpose of the present invention it is necessary that some means be provided for registering the pressure head thus created. A nipple 28 is formed on the side of the conduit below the level of the discharge end thereof and a length of rubber hose 29, or the like, has one end attached to the nipple and the other end attached to a length of glass tubing 30. The glass tubing is vertically disposed and is fixedly held in this position by means of a bracket 31 mounted on the extensible rod 25. The internal passage 32 of the nipple permits the fluid within the conduit to pass through the hose 29 and to rise within the glass tubing 30 a distance determined by the pressure of the liquid backed up in the flow line. The distance which the liquid rises in the glass tubing is measured from a datum point which is established by the horizontal leg of a bracket 33 fixedly mounted on the conduit. The bracket comprises a vertical leg 34 and a horizontal leg 35, which horizontal leg is located at the same level as the bottom of the discharge orifice of the conduit. The operator may thus, by resting a measuring stick on the leg 35 of the bracket 33, accurately measure the height to which the liquid rises in the glass tubing above the lowest level of the liquid discharging from the conduit.

The above-described apparatus permits the operator to obtain all the data necessary to enable him to calculate the rate of flow of the liquid through the flow line. By measuring the distance $a$ between the surface of the backed up liquid in the manhole 11 to the top of the cover 14 and by simultaneously measuring the distance $b$ between the liquid level in the glass tubing 30 and the top of the cover 15, the necessary data for the test is obtained. It is of course necessary that the operator know the difference in height $c$ of the covers 14 and 15 and this may be obtained by means of a surveyor's level or by any other suitable means. By adding the distances $b$ and $c$ and subtracting the distance $a$, the distance $d$ between the level of the liquid in the glass tubing 30 and the level of the liquid in the manhole 11 is obtained. The distance $d$ constitutes the hydraulic gradient or head loss created by the backed up liquid in the flow line. Now, by knowing the cross-sectional area of the discharge mouth of the conduit and by ascertaining the height of the liquid in the glass tube 30 above the datum point 35, the operator may readily compute the quantity of water flowing through the conduit. The correlation between head loss and conduit area can be made either by calculation according to well-known mathematical formulas or by reference to a previously prepared chart or table. Knowing the flow gradient and rate of flow, the operator may then compute the friction coefficient for the section of flow line being tested and also determine the carrying capacity thereof in terms of the percentage of the carrying capacity of new pipe or a pipe in first class cleaned condition.

If it is only desired to make a rate of flow test, any known size of discharge orifice may be provided for the conduit 16 and it is immaterial as to whether or not the liquid discharging from the conduit entirely fills the discharge orifice. If the liquid discharging from the conduit only fills the lower portion of the end 18, the rate of flow may yet be accurately determined by employing the conventional computations used in connection with a weir test. If, however, it is desired to make the sewer capacity test, then it is absolutely essential that a plate having an outlet orifice of a size sufficiently small to restrict the flow of liquid be applied to the outlet end of the conduit so that the liquid will back up in the manhole 11 a sufficient distance to be above the crown of the sewer at that point. Under these conditions there will be friction along the entire surface of the portion of the flow line being tested inasmuch as the entire section of the flow line between the manholes 11 and 12 will be filled.

It is proposed therefore to provide a plurality of removable plates 36, as illustrated in Figure 5. The plate here illustrated comprises a circular disk 37 having the same cross-sectional area as the conduit which disk is provided with an axially extending lip or flange 38, which snugly receives the discharge end of the conduit to hold the plate transversely across the discharge opening thereof. I have provided diametrically opposed set screws 39 in the flange which may be threaded into engagement with the conduit to hold the plate normally securely, but detachably associated therewith. It is to be understood that any suitable means may be provided for holding the plates associated with the conduit and that the present arrangement is merely shown to illustrate an operative means for performing this function. The plurality of plates are each provided with a discharge orifice 40 and the orifices of the various plates differ in size whereby the operator may select the plate best suited to accommodae the particular rate of flow of the liquid within the flow line 10. It should be remembered in this connection that it is desired that the liquid pass through the conduit but that the discharge orifice be sufficiently small so that the liquid will be caused to back up into the manhole 11. Therefore, the discharge orifice should be of a size slightly smaller than a discharge orifice which would just accommodate the flow traversing the flow line at the time the test is being made. Experience teaches that with relatively flat grades in the sewers, a change of the plate is seldom necessary if a little judgment is used in the initial selection of the orifice plate. As soon as the water has backed up into the flow line a substantial distance so that a sufficient head is created to cause the water to be restricted by the entire periphery of the discharge orifice, the sewer capacity test may be made. It will be readily apparent that the flow of the liquid back into the flow line, regardless of its magnitude, will become stable at some given height of the liquid in the glass tubing 30 and for a definite hydraulic gradient $d$, both depending only upon the present interior condition of the section of the flow line between the manholes 11 and 12. The readings are taken simultaneously and it makes no difference whether or not the flow has reached stability or equilibrium for the reason that the tests are taken at a definite moment and flow conditions at any one moment are stable although from moment to moment the condition of flow may be changing. If the rate of flow and the hydraulic gradient for any rate of flow are obtained, the exact carrying capacity of the tested section of the sewer may be accurately determined.

It may thus be seen that by using the apparatus hereinabove described the rate of flow of the liquid within the flow line may be accurately determined and the present capacity of the sewer may be accurately calculated. From this information the operator may readily ascertain the percentage of cloggage of the sewer section being tested and readily determine whether or not it is necessary that the sewer be cleaned to enable it to accommodate the peak flow which the particular sewer is required to carry. The metering device here illustrated need be left in the flow line for only a short interval of time and it will be readily apparent that the insertion or removal of the meter into or from the flow line may be easily and expeditiously accomplished.

If desired, a pressure sensitive member 41 may be attached to the conduit 16 by means of a suitable pipe connection 42. The pressure sensitive member may be of the diaphragm operated type or any other type suitable to accomplish the desired end. The member 41 operates a recording gauge 43 to which it is connected by means of the tubing 44, which gauge is removably secured in the lower manhole 12 as by means of the extensible rod 45. The gauge 43 is adapted to register the pressure of the liquid traversing the conduit over a substantial interval of time and where this device is used it is therefore necessary that the conduit remain in the flow line for a substantial length of time.

Thus, the operator may desire to know the peak flow of the liquid traversing the flow line over an interval of twenty-four hours. The conduit is installed in the flow line and left in this position for this interval of time. The recording gauge will register the variations of pressure in the liquid during the interim and will make a permanent record which the operator may study at his leisure.

It is to be understood that the form of my invention, herewith shown and described, is to be taken as a preferred example of the same, and that various changes in the size, shape and arrangement of parts may be resorted to without departing from the spirit of my invention, or scope of the appended claims.

Having thus described my invention, I claim:
1. A liquid metering device comprising a tubular conduit having horizontal end portions disposed one above the other, an inflatable member mounted on the lower end of the conduit and adapted to be inflated to set up a fluid tight connection with the internal wall of a flow pipe in which the same is coaxially disposed whereby fluid flowing through the pipe is required to flow through the conduit, means for registering the pressure of the fluid within the conduit, and a plate having an orifice therein detachably mounted transversely of the upper end of the said conduit.

2. A metering device for a flow pipe system including a flow pipe inclined from the horizontal and spaced vertically disposed tubular members connected thereto and communicating therewith at its opposite ends, said metering device comprising a conduit of lesser diameter than the flow pipe and having parallel end portions disposed one above the other, means for securely but detachably securing the lower end of the conduit in the lower end of the flow pipe whereby the upper end of the conduit will extend into the lowermost vertical member and whereby fluid flowing through the pipe is required to flow through the conduit, and pressure sensitive means connected to the conduit for registering the pressure of the fluid traversing the same.

3. A metering device for a flow pipe system including a flow pipe inclined from the horizontal and spaced vertically disposed tubular members connected thereto and communicating therewith at its opposite ends, said metering device comprising a conduit of lesser diameter than the flow pipe having parallel end portions disposed one above the other, means for securely but detachably securing the lower end of the conduit in the lower end o the flow pipe whereby the upper end of the conduit will extend into the lowermost vertical member, pressure sensitive means connected to the conduit for registering the pressure of fluid traversing the same, and a plate having an orifice therein detachably secured across the open upper end of the conduit.

4. A metering device adapted for installation in a gravity flow line having a predetermined flow gradient comprising a conduit, means carried by the conduit having a sealed engagement with the internal wall of the flow line for holding one end of the conduit within the flow line whereby fluid traversing the flow line will be required to flow through the conduit, the unattached end of said conduit extending above the portion of the flow line to which the conduit is attached so that the fluid will back up into the flow line to provide a hydraulic gradient, a plate having a discharge orifice and being adapted to be detachably connected to the unattached end of the conduit to restrict the discharge of the conduit, and a pressure sensitive recording means having connection with said conduit, said last mentioned means being responsive to variations in the pressure in the conduit and being operative to keep a continuous record of fluctuations in the pressure in the conduit for a selected period of time.

5. A metering device adapted for installation in a gravity flow line having a predetermined flow gradient comprising a conduit, means carried by the conduit having a sealed engagement with the internal wall of the flow line for holding one end of the conduit within the flow line whereby fluid traversing the flow line will be required to flow through the conduit, the unattached end of said conduit extending above the portion of the flow line to which the conduit is attached so that the fluid will back up into the flow line to provide a hydraulic gradient, means for varying the size of the discharge orifice at the unattached end of the conduit whereby to regulate the discharge of the conduit to any particular rate of flow, and a pressure sensitive recording means having connection with the said conduit, said last named means being responsive to variations in the pressure in the conduit and being operative to keep a continuous record of fluctuations in the pressure in the conduit for a selected period of time.

RICHARD BENNETT.